Sept. 18, 1951         K. CLARK         2,568,185
IMPELLER AND DETERGENT DISPENSER
Filed Nov. 22, 1946
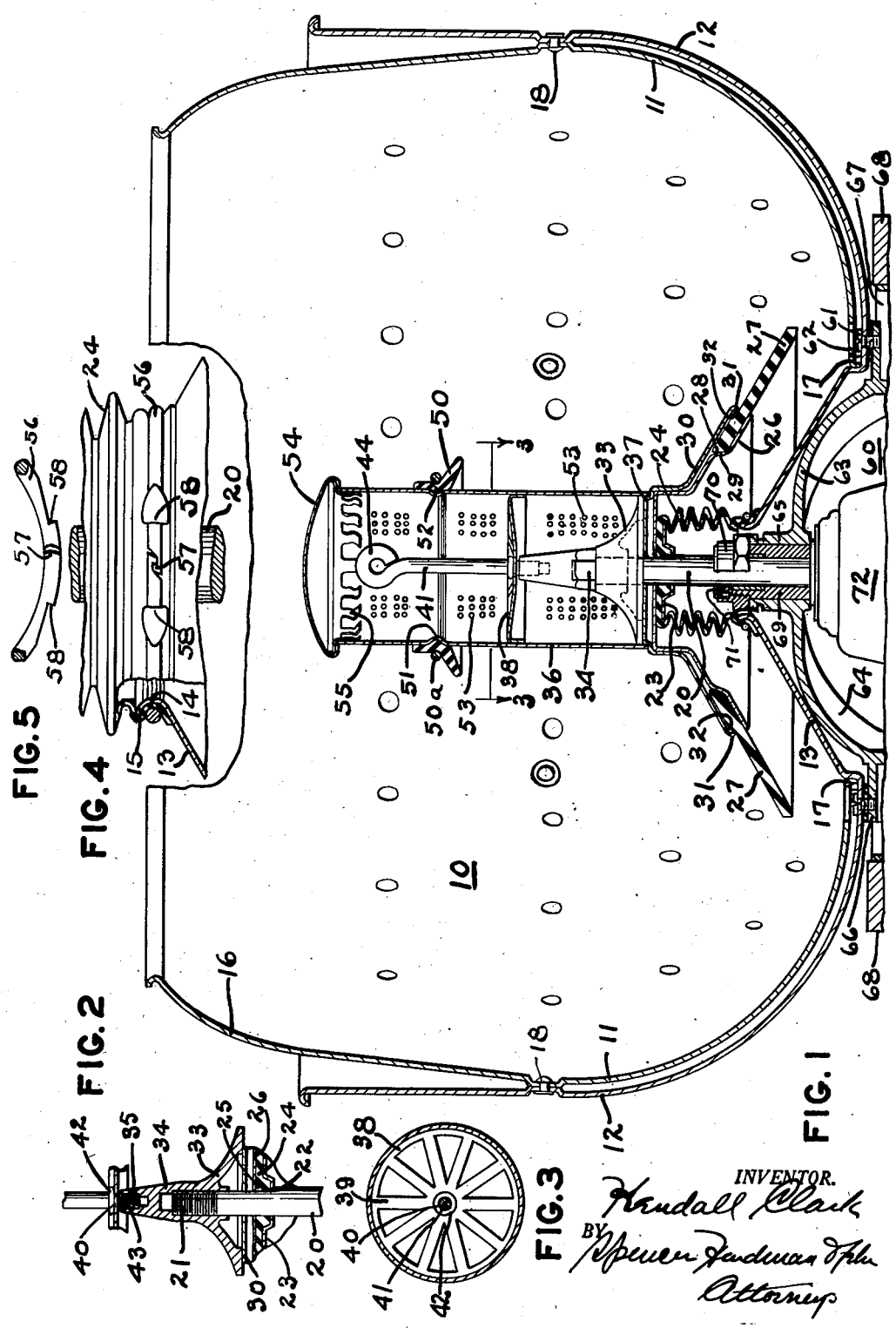
INVENTOR.
Kendall Clark
BY
Spencer Hardman John
Attorneys Patented Sept. 18, 1951

2,568,185

UNITED STATES PATENT OFFICE 2,568,185

IMPELLER AND DETERGENT DISPENSER

Kendall Clark, Oakwood, Ohio, assignor to General Motors Corporation, Dayton, Ohio, a corporation of Delaware Application November 22, 1946, Serial No. 711,508

3 Claims. (Cl. 68—17)

1

This invention relates to domestic appliance and more particularly to washing machines.

An object of this invention is to provide a washing machine of an improved construction for the automatic distribution of detergent in the wash-water.

Another object of this invention is to provide an improved construction for the assembly of an agitator capable of distributing the detergent in wash-water.

Another object of this invention is to provide an improved construction permitting ease of assembly of a washing tub, a resilient bellows, and an agitator.

Further objects and advantages of the present invention will be apparent from the following description reference being had to the accompanying drawings, wherein a preferred form of the present invention is clearly shown.

In the drawings:

Fig. 1 is a vertical cross-sectional view of a washing machine embodying features of my invention;

Fig. 2 is a vertical cross-sectional view of the central portion of the agitator shown in Fig. 1;

Fig. 3 is a horizontal cross-section taken along the line 3—3 of Fig. 1;

Fig. 4 is an enlarged elevation, partly in cross-section of the attaching construction between the bellows and the tub; and Fig. 5 is a plan view of a portion of the split ring shown in Fig. 4.

A washing machine, according to my invention, may include a rotatable tub 10, including an inner perforated basket 11 and an outer imperforate casing 12. Both of these may have circular horizontal cross-sections. The outer casing 12 may be provided with a central upwardly directed cone-shaped bottom 13, provided with an outwardly flared central opening 14, having an outer flange or flare 15. The inner basket 11 is inwardly contracted at 16, at the top, and is provided with a small downwardly directed flange 17 at its lower end. The basket 11, and the outer casing 12 are secured together by means of a series of rivets, or nuts and bolts, 18, positioned around the periphery of the tub.

A vertically reciprocable shaft 20 passes through the opening 14, and is provided with an upper threaded end 21. Also, adjacent its upper end, the shaft 20 is provided with a shoulder 22. A washer 23 is placed over the shaft 20, and rests on the shoulder 22. A resilient bellows 24, of rubber or the like, has a tight fitting opening 25 over the end of the shaft 20, and rests on the washer

2

23. A lower rigid agitating cone 26 rests on top of the bellows 24. An outer resilient cone-shaped ring 27 rests on the cone 26, with its inner edge 28 adjacent an offset shoulder 29 in the cone 26. An upper rigid agitating cone 30 rests on the ring 27 and on the lower agitating cone 26, to position and hold the ring 27 in place. For this purpose an inwardly directed flange 31 is provided on the lower outer periphery of the cone 30, and this engages a shoulder 32 formed in the ring 27, thus insuring that the ring 27 is securely held in place. A cone-shaped nut 33 clamps the upper portion of the cone 30, the nut 33 being in threaded engagement with the upper end of the shaft 20. For ease in assembly, the nut 33 is provided with a hexagonal portion 34. If desired, a thin washer, made, for example, of white cellulose nitrate, not shown, may be interposed between the bottom of the nut 33 and the cone 30 during assembly to allow the nut 33 to rotate more freely relative to the cone 30.

The nut 33 is provided with an internal thread 35 at its upper end. A cylindrical perforated detergent tube 36 is placed over the nut 34, and has its lower end surrounding a small flange 37 at the upper end of cone 30. The tube 36 is provided with an intermediate spider or bridge 38, welded to the tube 36. The spider 38 includes radial arms 39, and a central opening 40. A fastening rod 41 is provided with a flange 42, for engagement with the periphery of opening 40. The lower end of the rod 41 is provided with an external thread 43 which engages the internal thread 35 and the cone 33. The upper end of rod 41 is provided with a turning hook or handle 44. Thus the tube 36 may be secured in place, by threading the rod 41 into the thread 35, and thus tightly clamping the tube, by the action of flange 42.

Intermediate the ends of the tube 36, a liquid directing cone 50 may be secured to the tube 36. For this purpose the tube 36 may be circumferentially indented at 51, so that the resilient rubber flange 50 may be placed over the tube 36, and may be held in place by its inherent resiliency, together with the action of a circumferential protuberance 52 formed in the flange 50. The flange 50 directs liquid into the tube 36, through the openings 53, and thus causes the detergent to be dissolved by the water surging into and out of the tube 36. If desired, a split ring 50a may be placed around flange 50, which ring may be similar to the ring 56 hereafter described.

A cover 54 is placed over the upper end of the tube 36. It is provided with a plurality of resilient fingers 55, which engage the inner wall of the tube 36, and hold the cover in place by frictional engagement.

The washing machine structure herein disclosed may form a portion of a washing machine, such as is disclosed in my Patent No. 2,366,236, granted January 2, 1945, the portions of the washing machine not herein disclosed, being substantially as disclosed in my said patent.

The lower end of the bellows 24 is placed over the flange 15, and is securely held in place by a metal split ring 56. The ends of the ring 56 are provided with interlocking hooks 57, and with shoulders 58. The ring 56 may be hooked together by pliers, or by any specially designed tool capable of contracting the ring 56 and hooking the portions 57 together.

The tub 10 is attached to a counterbalancing ring structure 60. The tub may be attached by means of bolts 61, which may be manipulated through openings 62 in the basket 11. The counterbalancing ring structure 60 may include a cast dome 63, having reinforcing webs 64, a hub 65, ears 66, springs 67 and a flywheel ring 68. The ring 68 may vibrate relatively to the tub 10 and dome 63 at a frequency substantially equal to the frequency of rotation at maximum speed. The bolts 61 may have threaded engagement with the ears 66.

The dome 63 is keyed to the rotatable sleeve 69, and is held in place by the nut 70, which is threaded on the sleeve 69. A liquid seal 71 is placed in the upper part of nut 70, through which passes the vertically reciprocable shaft 20. The sleeve 69 and shaft 20 may be operated by mechanism within the casing 72, which mechanism may be substantially as disclosed in my Patent 2,366,236.

The structure herein disclosed may be assembled by riveting the basket 11 and casing 12 together. The counterbalancing structure 60 is then secured to the tub 10 by means of bolts 61. The tub 10 and structure 60 are then placed over the shaft 20 and sleeve 69. Thereafter the nut 70 is used to secure the structure 60 in place. Thereafter, the washer 23 and bellows 24 are placed over the shaft 20 and the lower end of the bellows is secured by split ring 56. The cone 26, ring 27 and cone 30 are then placed over the shaft 20 and are clamped in place by the nut 33, with or without the cellulose washer, hereinbefore described. Thereafter the tube 36 is placed over the nut 33, and the tube is secured in place by the rod 41. The agitating ring 50 is placed over the tube 36, and is secured in place.

In the operation of the machine, the clothes and water are introduced into the tub 10, as described in my patent. Powdered soap, or other detergent is placed inside the tube 36, and then the cover 54 is placed over the end of the tube 36. The shaft 20 is then vertically reciprocated, as described in my patent, thus causing toroidal circulation of the water and clothes, and inward and outward surging of the water into the perforated tube 36, by action of the flange 50. This disseminates the detergent into the water and clothes in the tub 10. Thereafter the tub is rotated to discharge the wash-water. Subsequently the tub 10 is refilled once or twice with clear water, followed by agitation and rotation to rinse the clothes. Preferably no detergent is added for these rinsing operations. After the final rotation of the tub 10, the clothes may be removed and hung to dry. Some clothes may be ironed without further drying.

While the form of embodiment of the invention as herein disclosed, constitutes a preferred form, it is to be understood that other forms might be adopted, as may come within the scope of the claims.

What is claimed is as follows:

1. In a washing machine, a vertically reciprocable shaft having a shoulder adjacent its upper end and being threaded at its upper end, a rigid washer surrounding said shaft and resting on said shoulder, a flexible bellows surrounding said shaft and resting on said washer, a lower rigid agitating cone surrounding said shaft and resting on said bellows, an outer resilient cone-shaped ring resting on said lower rigid agitating cone, an upper rigid agitating cone surrounding said shaft and resting on said ring and lower rigid agitating cone, a nut clamping said upper rigid agitating cone and being in threaded engagement with the upper end of said shaft a detergent tube resting on said upper rigid agitating cone, and means in said tube detachably connecting said tube to said nut.

2. In a washing machine, a cone-shaped agitator construction having a lower agitating flange and a portion with a central thread at its upper part, a vertically disposed perforated detergent tube resting on said agitator construction and having an intermediate bridge, and a clamping rod having flanged engagement with said bridge and passing through said bridge and being in threaded engagement with said central thread.

3. In a washing machine, a vertically reciprocable shaft, a cone-shaped agitator construction secured to said shaft, said agitator construction being provided with means forming a threaded portion, a vertical detachable perforated detergent tube having one end resting on said agitator construction, a bridge in said tube, a fastening rod having flanged engagement with said bridge and threaded engagement with said threaded portion, and a removable cover at the upper end of said tube.

KENDALL CLARK.

REFERENCES CITED

The following references are of record in the file of this patent:

UNITED STATES PATENTS

| Number | Name | Date |
|---|---|---|
| 1,618,433 | Hubbard | Feb. 22, 1927 |
| 2,142,961 | Kuhn | Jan. 3, 1939 |
| 2,163,273 | Deschere | June 20, 1939 |
| 2,346,152 | Clark | Apr. 11, 1944 |
| 2,384,903 | Ferris | Sept. 18, 1945 |
| 2,406,198 | Clark | Aug. 20, 1946 |